US010773784B2

(12) United States Patent
Huber et al.

(10) Patent No.: US 10,773,784 B2
(45) Date of Patent: Sep. 15, 2020

(54) FLOOR MODULE OF AN AIRCRAFT CARGO HOLD

(71) Applicant: TELAIR INTERNATIONAL GMBH, Miesbach (DE)

(72) Inventors: Thomas Huber, Schliersee (DE); Richard Holzner, Stephanskirchen (DE)

(73) Assignee: Telair International GmbH (DE)

( * ) Notice: Subject to any disclaimer, the term of this patent is extended or adjusted under 35 U.S.C. 154(b) by 149 days.

(21) Appl. No.: 15/558,698

(22) PCT Filed: Mar. 21, 2016

(86) PCT No.: PCT/EP2016/056083
§ 371 (c)(1),
(2) Date: Sep. 15, 2017

(87) PCT Pub. No.: WO2016/150891
PCT Pub. Date: Sep. 29, 2016

(65) Prior Publication Data
US 2018/0111674 A1    Apr. 26, 2018

(30) Foreign Application Priority Data

Mar. 20, 2015   (DE) .......................... 10 2015 104 230
Oct. 15, 2015   (DE) .......................... 10 2015 117 571

(51) Int. Cl.
*B64C 1/20*    (2006.01)
*B64D 9/00*    (2006.01)

(52) U.S. Cl.
CPC . *B64C 1/20* (2013.01); *B64D 9/00* (2013.01)

(58) Field of Classification Search
CPC .... B64D 9/00; B64D 2009/006; B64D 9/003; B64C 1/20; B64C 1/22; B64C 1/18
See application file for complete search history.

(56) References Cited

U.S. PATENT DOCUMENTS

| 2,173,298 A |   | 9/1939 | Gravenstine |
|---|---|---|---|
| 3,709,450 A |   | 1/1973 | Watts |
| 3,902,583 A | * | 9/1975 | Laibson ................... B64C 1/20 |
|   |   |   | 193/35 MD |

(Continued)

FOREIGN PATENT DOCUMENTS

| CA | 2859329 A1 | 3/2015 |
|---|---|---|
| DE | 19633032   | 2/1997 |

(Continued)

OTHER PUBLICATIONS

Search Report and Written Opinion issued in App. No. PCT/EP2016/056083 (dated 2016).

(Continued)

*Primary Examiner* — Assres H Woldemaryam
(74) *Attorney, Agent, or Firm* — Barnes & Thornburg LLP

(57) ABSTRACT

A floor module for an aircraft cargo hold including a cover element and a floor element which is spaced apart from the cover element at least in some segments and which is attached to an underside of the cover element. The cover element includes receiving openings for receiving ball elements. The cover element and the floor element can be formed as a hybrid composite part.

16 Claims, 7 Drawing Sheets

(56) References Cited

U.S. PATENT DOCUMENTS

| | | | | |
|---|---|---|---|---|
| 4,000,870 | A * | 1/1977 | Davies | B64C 1/20 |
| | | | | 410/92 |
| 4,050,655 | A | 9/1977 | Bogue | |
| 4,696,583 | A * | 9/1987 | Gorges | B60B 33/08 |
| | | | | 16/26 |
| 5,464,086 | A * | 11/1995 | Coelln | B65G 39/025 |
| | | | | 193/35 B |
| 5,890,582 | A * | 4/1999 | McKinnon | B65G 13/071 |
| | | | | 193/35 MD |
| 6,125,984 | A * | 10/2000 | Huber | B64C 1/20 |
| | | | | 193/35 MD |
| 6,926,481 | B2 | 8/2005 | Huber | |
| 8,226,034 | B2 | 7/2012 | Huber et al. | |
| 8,851,488 | B2 * | 10/2014 | Carruyo | B60P 7/08 |
| | | | | 280/79.11 |
| 9,238,551 | B2 * | 1/2016 | Kalitta | B65G 39/12 |
| 9,963,232 | B2 * | 5/2018 | Rajeev | B64D 9/00 |
| 10,059,523 | B1 * | 8/2018 | Chitragar | B64C 1/20 |
| 2003/0156914 | A1 * | 8/2003 | Huber | B64C 1/20 |
| | | | | 410/80 |
| 2004/0218989 | A1 * | 11/2004 | Huber | B64C 1/20 |
| | | | | 410/92 |
| 2005/0224645 | A1 * | 10/2005 | Huber | B64C 1/20 |
| | | | | 244/118.1 |
| 2006/0065786 | A1 * | 3/2006 | Huber | B64C 1/20 |
| | | | | 244/137.1 |
| 2006/0137294 | A1 * | 6/2006 | Waits, Jr. | F16B 5/01 |
| | | | | 52/787.1 |
| 2006/0231681 | A1 * | 10/2006 | Huber | B64C 1/061 |
| | | | | 244/119 |
| 2010/0230230 | A1 * | 9/2010 | Huber | B64D 9/00 |
| | | | | 193/35 R |
| 2010/0230537 | A1 * | 9/2010 | Huber | B64C 1/20 |
| | | | | 244/118.2 |
| 2011/0095572 | A1 * | 4/2011 | Wary | B32B 3/12 |
| | | | | 296/193.07 |
| 2012/0061511 | A1 * | 3/2012 | Huber | B64C 1/20 |
| | | | | 244/118.1 |
| 2012/0304579 | A1 * | 12/2012 | Dezoete | B64F 5/10 |
| | | | | 52/582.2 |
| 2012/0312926 | A1 * | 12/2012 | Holzner | B64D 9/00 |
| | | | | 244/137.1 |
| 2013/0297065 | A1 * | 11/2013 | Huber | B64C 1/22 |
| | | | | 700/230 |
| 2013/0313073 | A1 * | 11/2013 | Huber | B64D 9/00 |
| | | | | 198/464.2 |
| 2013/0340364 | A1 * | 12/2013 | Haselmeier | E04C 2/52 |
| | | | | 52/220.2 |
| 2013/0340601 | A1 * | 12/2013 | Townsend | B64C 1/20 |
| | | | | 89/36.02 |
| 2016/0244186 | A1 * | 8/2016 | Brown | B64D 9/00 |

FOREIGN PATENT DOCUMENTS

| | | | |
|---|---|---|---|
| DE | 19720224 | | 10/1998 |
| DE | 19812014 | | 8/1999 |
| DE | 102004006648 | | 9/2005 |
| DE | 102004044653 | | 4/2006 |
| DE | 602005001782 | | 4/2008 |
| DE | 102009012426 | | 9/2010 |
| DE | 102012005353 | | 9/2013 |
| DE | 102012008853 | | 10/2013 |
| DE | 102013207645 | | 10/2014 |
| EP | 0864489 | | 9/1998 |
| EP | 0912394 | | 5/1999 |
| EP | 1564141 | | 8/2005 |
| EP | 1646556 | | 4/2006 |
| EP | 1646558 | | 4/2006 |
| EP | 2679485 | | 1/2014 |
| EP | 2679485 | A1 * | 1/2014 ......... B64D 11/0015 |
| GB | 2417619 | | 3/2006 |
| WO | WO 2005/077755 | | 8/2005 |
| WO | WO 2013/135855 | | 9/2013 |

OTHER PUBLICATIONS

English Translation of International Preliminary Report on Patentability, PCT/EP2016/056083, dated Sep. 26, 2017.

* cited by examiner

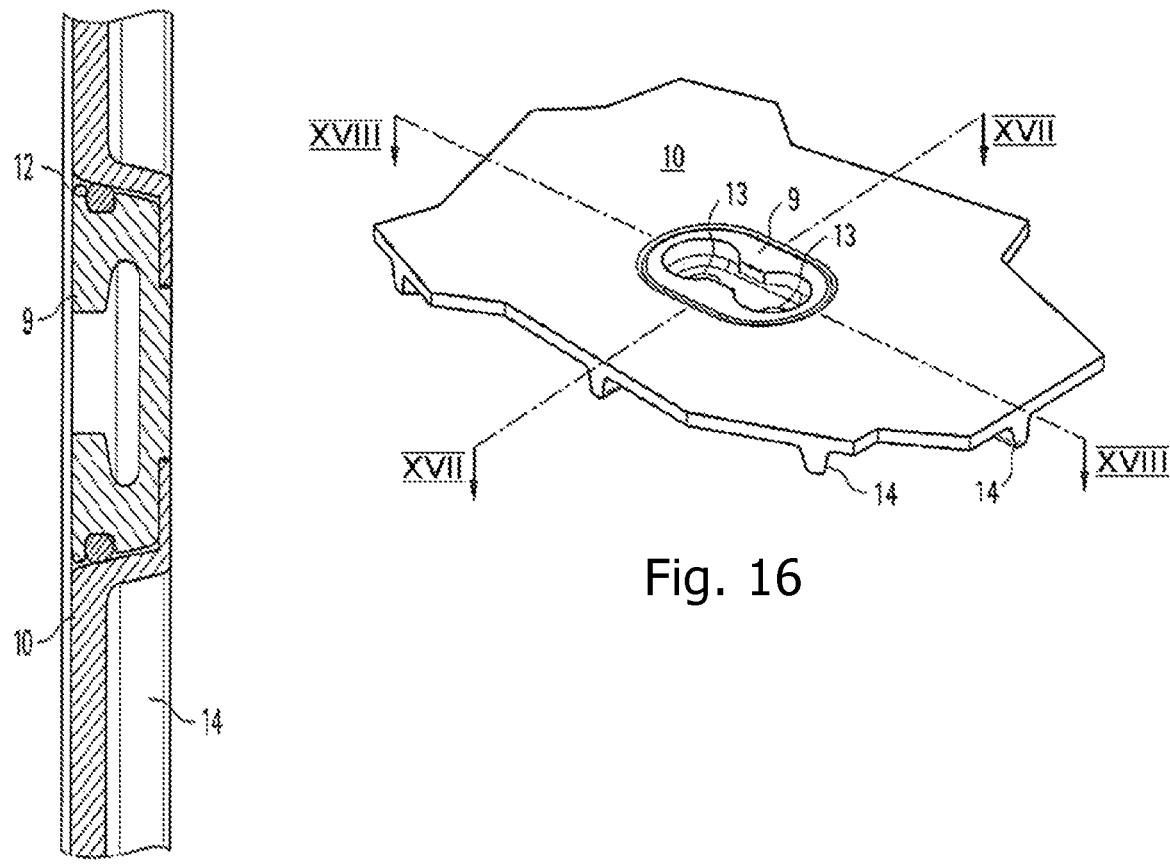
Fig. 16
Fig. 17
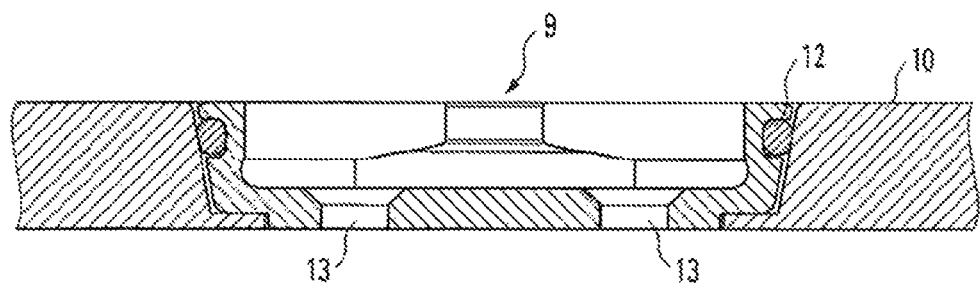
Fig. 18

FLOOR MODULE OF AN AIRCRAFT CARGO HOLD

CROSS REFERENCE TO RELATED APPLICATIONS

This application is a U.S. nationalization under 35 U.S.C. § 371 of International Application No. PCT/EP2016/056083, filed Mar. 21, 2016, which claims priority to German Patent Application No. 10 2015 104 230.4, filed Mar. 20, 2015, and German Patent Application No. 10 2015 117 571.1, filed Oct. 15, 2015. The disclosures set forth in the referenced applications are incorporated herein by reference in their entireties.

BACKGROUND OF THE INVENTION

The invention relates to a floor module of an aircraft cargo hold.

Cargo which is introduced through a door into the cargo hold of an aircraft must be transported further in this cargo hold and secured in the cargo hold. The floor of such a cargo hold is preferably formed in a modular manner, as is known, for example, from EP 1 646 556 B1.

A major problem in the construction of such a cargo hold floor is the contradictory demand for great stability and low weight. Moreover, neither the individual components nor the installation thereof may be too complex, since this increases costs.

BRIEF SUMMARY OF THE INVENTION

It is the object of the invention to provide a floor module of an aircraft of the type mentioned in the introduction above which makes it possible to achieve a high degree of stability combined with low production costs and installation costs at low weight.

This object is achieved by a floor module as disclosed herein.

In particular, this object is achieved by a floor module of an aircraft cargo hold, comprising a cover element and a floor element which is spaced apart from the cover element at least in some segments and which is attached to an underside of the cover element, in such a way that the cover element is designed as an integrative surface element which has mounting regions, in which freight-handling systems such as rollers, latches or PDUs can be mounted and in which the cover element is lowered to a level of the floor element.

An essential point of the invention is thus that, in contrast to a technical solution, as is known, for example, from EP 0 912 394 B8, the floor element does not form a simple plate. Instead, a three-dimensional part is produced, in which the cover element is only lowered in some areas where a component has to be countersunk or has to be connected to the floor element for fastening to underlying structures.

This three-dimensional deformation with elevations and depressions already results in a higher stability of the overall arrangement, so that a thinner material can be used.

In particular, the present invention is suitable for use as a floor module in the area of a cargo hold door, wherein the cover element then has receiving openings for receiving ball elements.

Preferably, the floor element is connected to circumferential edges of the cover element and seals it essentially tightly in downward direction. This ensures that the cargo hold is sealed off from the bilge, which is important for example when halon is injected in case of fire.

Preferably, the floor element is designed in such a way that leaking liquids, in particular water entrained with the load, can be collected and discharged.

The cover element is preferably at least twice, but especially preferably at least three to five times, as thick as the floor element. Therefore, notice is taken here that such elements which must absorb loads perpendicular to the surface are formed much more strongly than those elements which do not have to absorb such loads. Particularly when spherical elements are mounted in the floor element, they are introduced by "suspension" into the cover element and connected to it. Separate reinforcements of the cover element in the areas in which the ball elements are installed can be provided.

The cover element has on at least one edge an upwardly arched section for covering the aircraft fuselage. On one edge only when the floor module is installed in the area of the aircraft door. Otherwise, these curved portions are provided on both sides of a cover element. This leads to a further simplification in the manufacture and assembly of the overall arrangement. In addition, the segment which is curved towards the flat surface of the cover element leads to a stiffening of the overall arrangement.

The floor module preferably has connecting elements between the cover element and the floor element. This results in an increased stiffness of the overall arrangement. Such a connecting element can, for example, comprise tube sleeves, by means of which fastening means, in particular screws for fastening freight-handling systems, e.g. tie-down elements, can be connected directly to transverse beams of the cargo hold. In this case, "one kills two birds with one stone", because, on the one hand, the fastening of the fastening means which absorbs the necessary tensioning force is enabled by the sleeves and, on the other hand, the connection of the cover element and the floor element is ensured by these sleeves.

The cover element is preferably firmly connected to the handling unit common to the floor element, which considerably facilitates assembly.

The cover element and/or the floor element is preferably constructed as a hybrid composite part, e.g. with carbon and/or glass fibre reinforcement. This allows the desired three-dimensional shaping to take place in a heatable press mould, so that a particularly efficient production of the floor module is ensured with high strength and low weight.

Further increased stability with facilitated assembly at the same time is ensured by functional rails, which can be attached to the floor module and are provided with the customary freight-handling systems. For example, all elements required in the area of a cargo hold door, such as stop rollers or overrideable latches, which prevent the rolling back of ULDs, are initially fastened in the functional rail, whereupon the entire functional rail is then connected to the floor module. This functional rail can then in turn fasten the floor module to the mounting structures of the aircraft. The same applies to functional rails for the receiving latches or PDUs, which are fixed in middle sections of the floor modules.

Preferably, the cover element has peripherally-mounted stop rails, which therefore do not have to be mounted separately in the cargo hold, and in addition ensure a further stiffening of the floor modules.

In order to be able to allow the economical and neat wiring of active elements such as PDUs or sensors, connecting chambers are preferably provided in the floor element for connecting and/or leading out connecting cables.

From the above, it is also established that a method for producing a described floor module is claimed as according to the invention.

BRIEF DESCRIPTION OF THE DRAWINGS

An embodiment of the invention is explained in closer detail below with reference to the drawings, wherein:

FIG. 16 shows a perspective view of the region XVI of FIG. 15,

FIG. 17 shows a sectional view along line XVII-XVII of FIG. 16 and

FIG. 18 shows a sectional view along line XVIII-XVIII of FIG. 16.

DETAILED DESCRIPTION OF THE INVENTION

Figure 1:
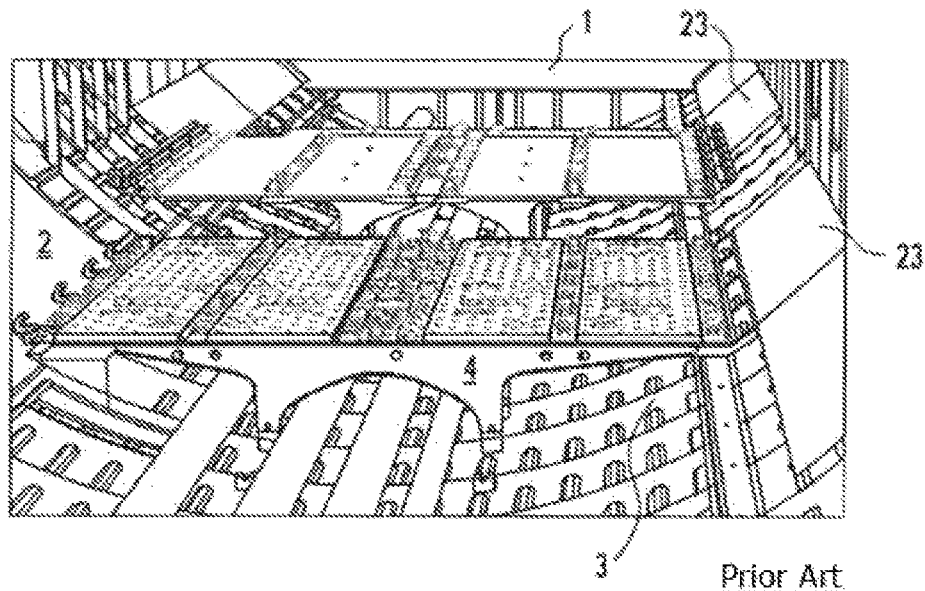
FIG. 1 shows a prior art cargo hold with a floor module.
Figure 2:
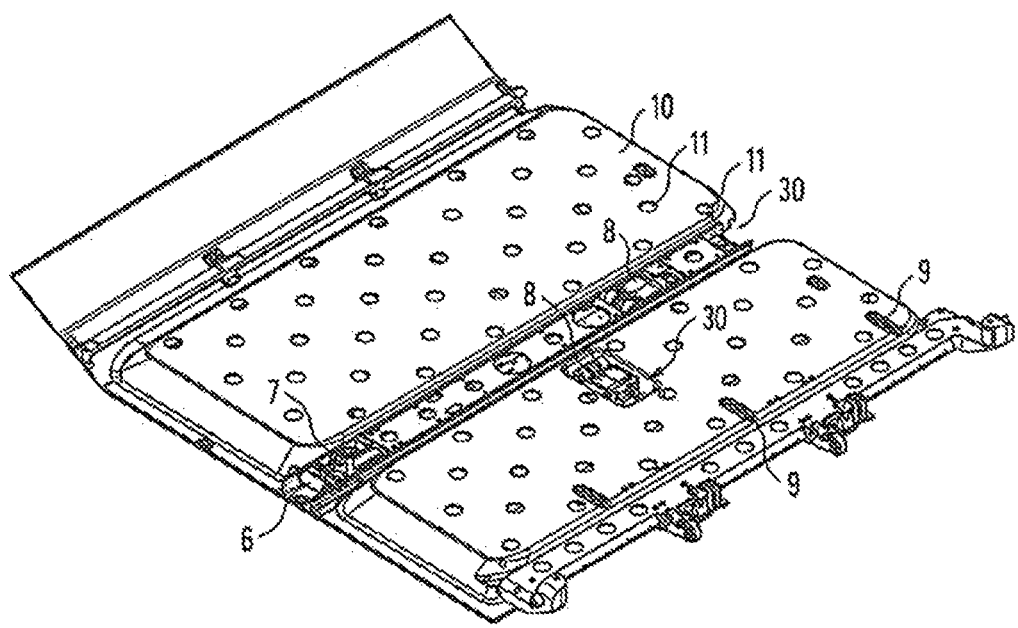
FIG. 2 shows a perspective top view of an embodiment of a floor module.

In the following description, the same reference numerals will be used for the same and similarly acting parts.

Firstly, a cargo hold with a floor module is described on the basis of the enclosed "prior art" drawing, as is known from EP 1 646 556 B1.

In a cargo hold 1 of an aircraft, a floor module is provided in the region of a cargo hold door 2, said floor module comprising transverse beams 4 which are fastened to frames 3. On this floor module, ball elements, PDUs, bolts, rollers and similar functional elements are mounted, which are necessary in a cargo hold of an aircraft. Separately from the module, the frames 3 of the aircraft are covered by cover surfaces 23.

The present invention, which is explained below with reference to FIGS. 2 to 12, is concerned with such a floor module, wherein a floor module is shown as an example in this case, which is attached (as explained above) in the region of a cargo hold door 2. Such a floor module has a particular plurality of individual elements, in particular ball elements, but also PDUs, bolts and the like arranged in different orientations. However, the invention is not limited to such a floor module installed in the region of a cargo hold door.

According to the drawings, a cover element 10 is provided which is covered downwards by a floor element 20. In its edge regions, the cover element 10 is connected directly to the floor element 20 (see FIG. 11 for example) or by interposing further elements (see FIG. 9).

The floor element 20 comprises mounting regions 30 (see especially FIG. 12) in which a PDU 8 (see FIG. 2) or a functional rail 40 (see FIG. 12) for accommodating PDUs, bolts, rollers or similar functional elements can be mounted.

The mounting region 30 is formed in such a way that the cover element 10 descends downwardly and rests on the floor element 20, or descends at least to its average level. The cover element 10 rests directly on the floor element 20 where the floor module extends over a transverse beam 4.

The floor element 20 furthermore has, in the middle regions, a trough structure 21, which conducts incoming water to an outlet connection 22, from which the water can be discharged.

In the embodiment of the invention shown here, a plurality of receiving openings 11 for ball elements are provided.

Figure 3:
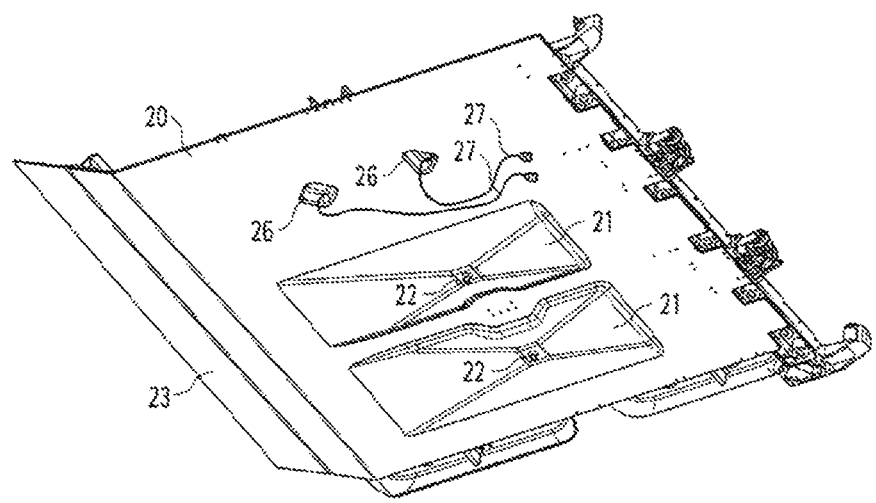
FIG. 3 shows a perspective bottom view of the module according to FIG. 2.
Figure 4:
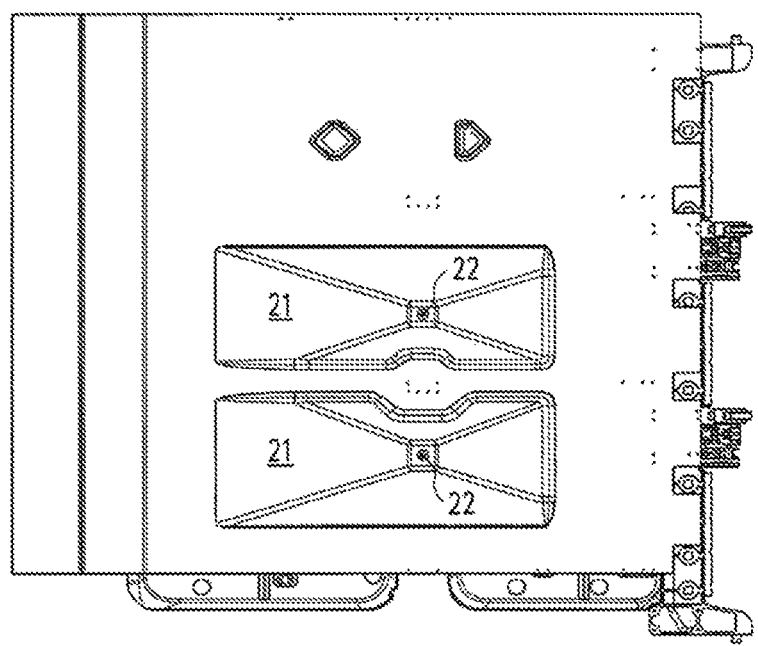
FIG. 4 shows a planar bottom view of the module according to FIG. 2 or 3.
Figure 6:
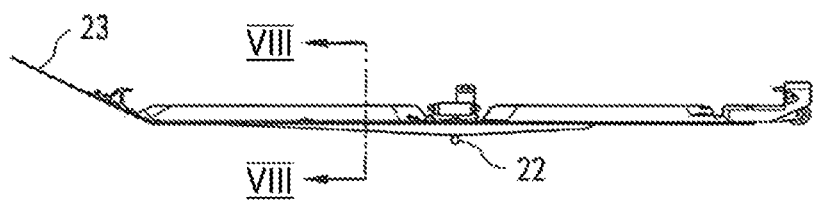
FIG. 6 shows a side view along line VI-VI of FIG. 5.
Figure 5:
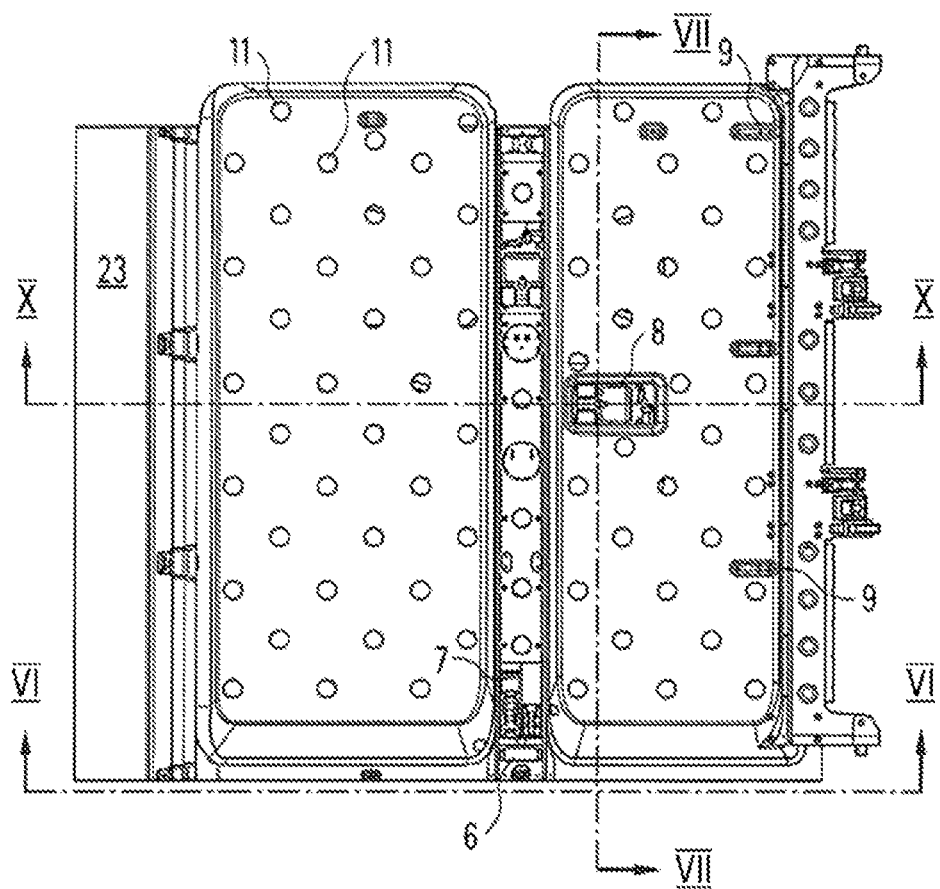
FIG. 5 shows a top view of the floor module according to FIGS. 2-4.
Figure 7:
FIG. 7 shows a sectional view along the line VII-VII of FIG. 5.
Figure 8:
FIG. 8 shows a sectional view along the line VIII-VIII of FIG. 6.

Furthermore, the floor element 20 has downwardly projecting connection chambers 26, through which connection cables 27 are guided to those functional units which require such connecting cables, i.e. to PDUs or sensors (see FIG. 3).

Furthermore, tie-down elements 9 are provided in the cover element 10 which are fastened to transverse beams 4 by means of bolts (not shown), wherein the bolts are guided through tube sleeves 25 (see FIGS. 9 and 10), which in turn connect the cover element 10 to the floor element 20. These sleeves thus simultaneously constitute a stiffening member between the cover element 10 and the floor element 20. Further stiffening members in the form of a support web 24 (see FIGS. 9 and 10) are also provided between cover elements 10 and floor elements 20.

Figure 11:
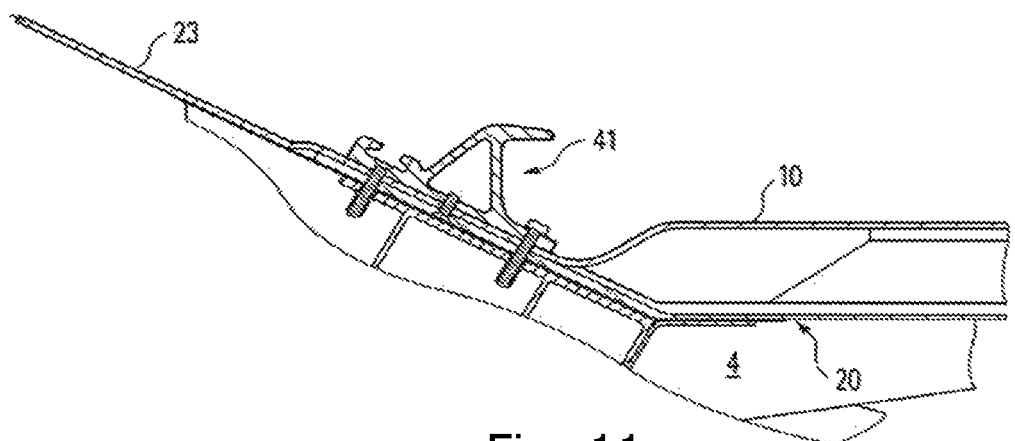
FIG. 11 shows an enlarged view corresponding to the region XI of FIG. 10.

As shown in FIG. 11, the edges of the floor element 20 and the cover element 10 are curved upwards in such a way that the cover element 10 simultaneously forms the cover surface 23 mentioned above. In this region, a stop rail 41 is also provided, which further peripherally stiffens the floor module.

Figure 12:
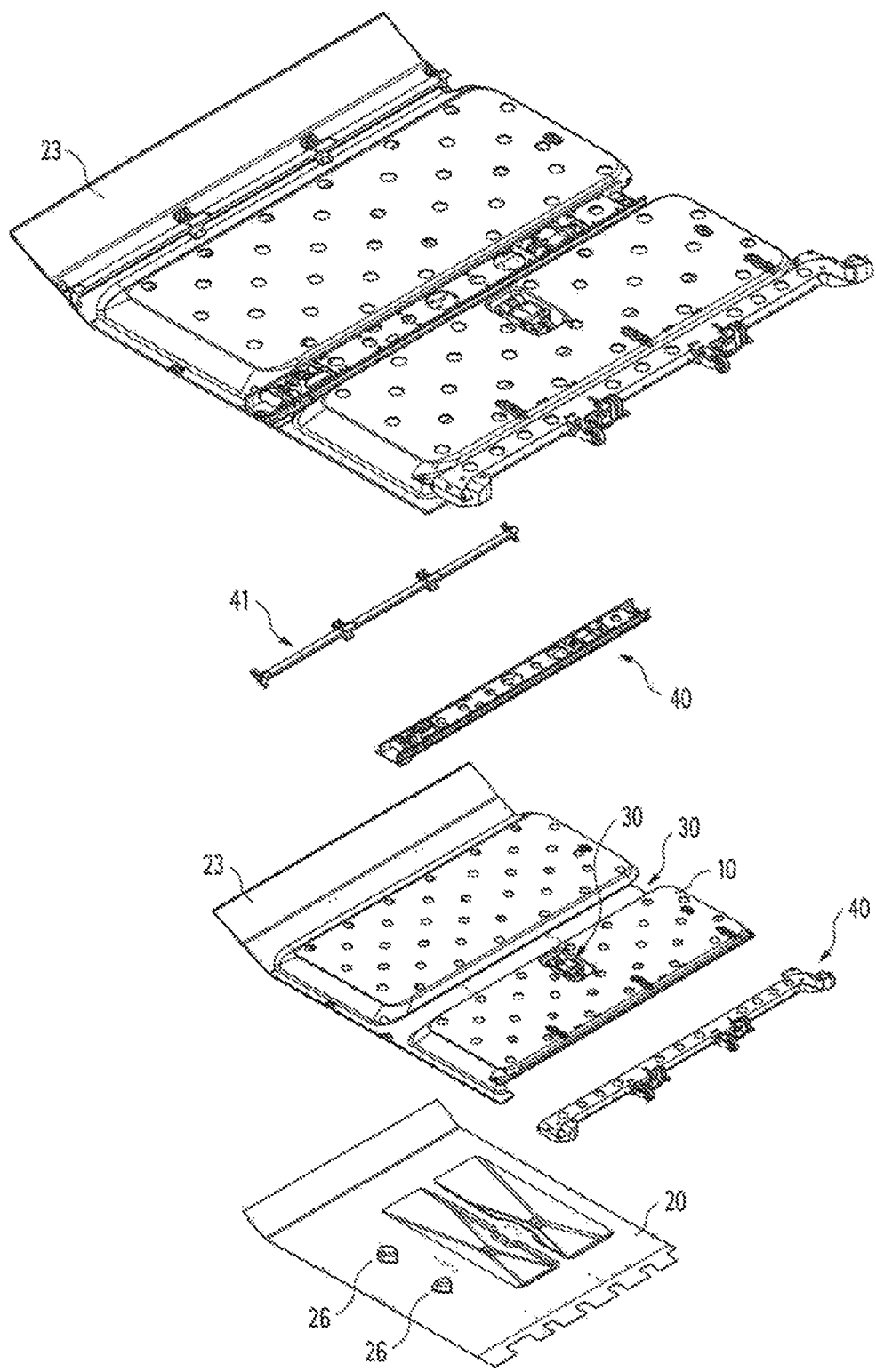
FIG. 12 shows a representation of the overall module with its individual parts.
Figure 13:
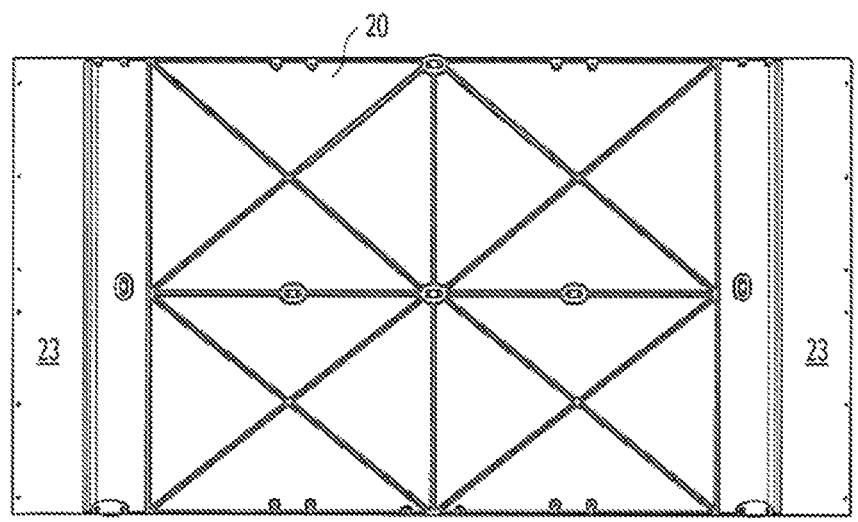
FIG. 13 shows a bottom view of a further floor module.
Figure 14:
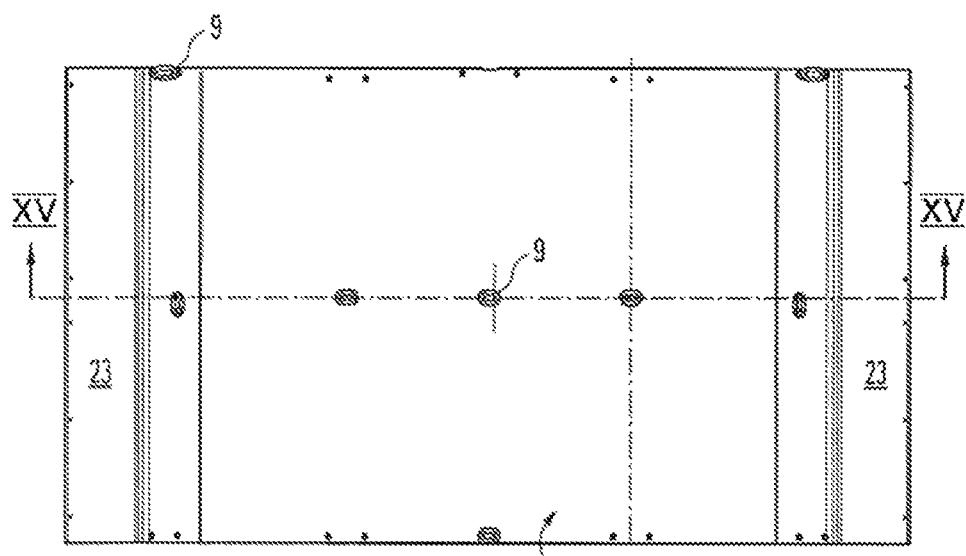
FIG. 14 shows a top view of the floor module according to FIG. 13.
Figure 15:
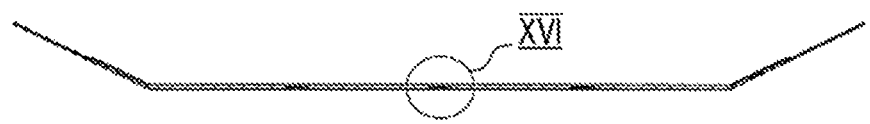
FIG. 15 shows a sectional view along the line XV-XV of FIG. 14.

When a floor module of this kind is assembled, as shown in FIG. 12, a cover part 10 is connected to a floor part 20, in particular on the edge side. This produces a component which traverses the entire cargo hold and which already has considerable stability due to the three-dimensional structure with the lowered mounting regions 30.

Figure 9:
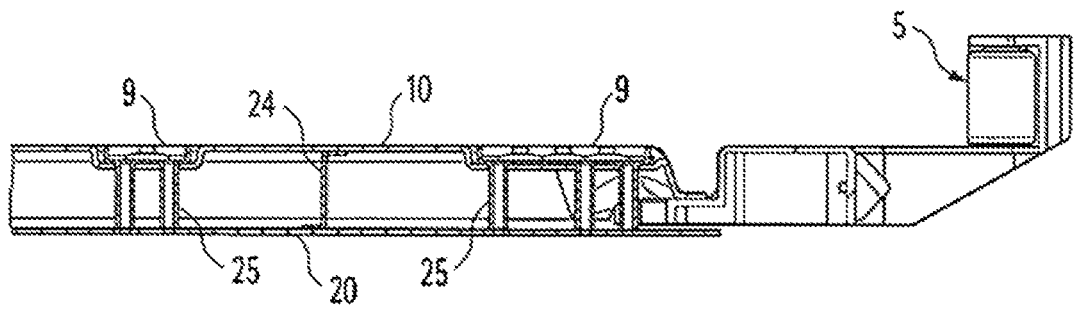
FIG. 9 shows a sectional view along line IX-IX of FIG. 5.
Figure 10:
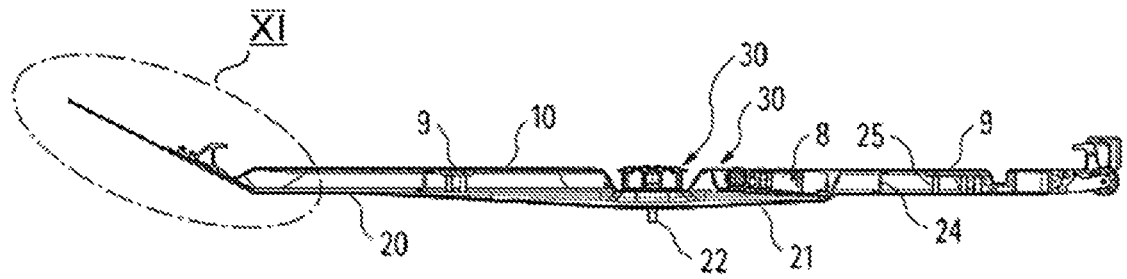
FIG. 10 shows a sectional view along the line X-X of FIG. 5.

Particularly stressed areas, such as the entrance area in the region of the cargo hold door 2 for example can be connected, as shown here, to a functional rail 40 which is inserted between the cover element 10 and the floor element 20 in the edges thereof, as shown in FIG. 9 for example.

The further functional rail 40 shown in FIG. 12, which is inserted into the central regions of the floor module, is provided for accommodating the functional elements, in particular for reasons of stability enhancement and assembly simplification.

The floor module shown in FIGS. 13 to 18 is designed as a bulk module, thus serving to fasten the load to be lashed, for which purpose tie-down elements are provided, which are formed here as "seat rail sections" into which eyelets or hooks can be suspended. These seat rail sections are held in place during transport and assembly by O-rings 12. After the tie-down element 9 has been fastened to a transverse beam 4 via its fastening holes 13, the O-ring serves as a seal. In this bulk module, the cover element 10 is provided with reinforcing ribs 14.

It is apparent from the above that an essential point of the invention is that by the use of preferably integral components which are lighter on the one hand and are provided with a larger area and shaped in a three-dimensional manner on the other hand, reduced weight is ensured at the same time with sufficient stability and optimal assembly facilitation.

LIST OF REFERENCE NUMERALS

1 Cargo hold
2 Cargo hold door
3 Frames
4 Transverse beams
5 Deflecting roller
6 Roller
7 Latch
8 PDU
9 Tie-down element
10 Cover element
11 Receiving opening for ball element
12 O-ring
13 Fastening hole
14 Reinforcing ribs
20 Floor element
21 Trough structure
22 Outlet connection
23 Cover surface
24 Support web
25 Tube sleeve
26 Connection chamber
27 Connecting cable
30 Mounting region
40 Functional rail
41 Stop rail

The invention claimed is:

1. A floor module for an aircraft cargo hold, the floor module comprising a cover element and a floor element which is spaced apart from the cover element at least in some segments and which is attached to an underside of the cover element, wherein the cover element is designed as an integrative surface element, wherein the cover element comprises receiving openings for receiving ball elements, wherein the cover element and the floor element are formed as a hybrid composite part, wherein the cover element and the floor element extend across the entire width of the cargo hold, wherein the floor element includes a first side connected to a rail and a second side having an upwardly curved section, which peripherally stiffen the floor module.

2. The floor module according to claim 1, wherein the floor element is connected to circumferential edges of the cover element and essentially tightly seals said floor element in the downward direction.

3. The floor module according to claim 1, wherein the floor element is designed for collecting and discharging liquids.

4. The floor module according to claim 1, wherein the cover element is formed from a first material and the floor element is formed from a second material, the first material forming the cover element having a thickness that is at least twice the thickness of the second material forming the floor element.

5. The floor module according to claim 1, wherein the cover element has, on at least one edge, an upwardly curved section for covering a portion of a fuselage of an aircraft.

6. The floor module according to claim 1, wherein connecting elements are provided between the cover element and the floor element.

7. The floor module according to claim 6, wherein the connecting elements comprise tube sleeves, by means of which fasteners are adapted to fasten tie-down elements directly to transverse beams of the cargo hold.

8. The floor module according to claim 1, wherein the cover element is fixedly connected to the floor element for common handling.

9. The floor module according to of claim 1, wherein the hybrid composite part of the cover element and/or the floor element comprises carbon fibres and/or glass fibres.

10. The floor module according to claim 1, wherein the rail which is attached to the floor element is provided with a freight-handling system.

11. The floor module according to claim 1, wherein the cover element comprises a peripherally mounted stop rail.

12. The floor module according to claim 1, wherein the floor element comprises connection chambers for connecting and/or extracting connection cables for freight-handling systems.

13. A use of a floor module according to claim 1 in the region of a cargo hold door.

14. The floor module according to claim 1, wherein the cover element is formed from a first material and the floor element is formed from a second material, the first material forming the cover element having a thickness that is at least three times the thickness of the second material forming the floor element.

15. The floor module according to claim 1, wherein the cover element is formed from a first material and the floor element is formed from a second material, the first material forming the cover element having a thickness that is at least five times the thickness of the second material forming the floor element.

16. The floor module according to claim 7, wherein the fasteners comprise screws.

* * * * *